United States Patent [19]

Sonderegger et al.

[11] Patent Number: 5,796,504
[45] Date of Patent: Aug. 18, 1998

[54] FIBER-OPTIC TELEMETRY SYSTEM AND METHOD FOR LARGE ARRAYS OF SENSORS

[75] Inventors: James F. Sonderegger, San Clemente; Robert H. Buckley, Santa Ana Heights, both of Calif.

[73] Assignee: Hughes Electronics, Los Angeles, Calif.

[21] Appl. No.: 596,898

[22] Filed: Mar. 13, 1996

[51] Int. Cl.$^6$ .............................. H04B 10/12; H04J 14/02
[52] U.S. Cl. .................... 359/144; 359/133; 359/168; 359/141
[58] Field of Search ................... 359/144, 168–171, 359/141, 133, 124

[56] References Cited

U.S. PATENT DOCUMENTS

| | | | |
|---|---|---|---|
| 3,584,220 | 6/1971 | Nomura et al. | 359/168 |
| 4,628,493 | 12/1986 | Nelson et al. | 359/168 |
| 4,658,394 | 4/1987 | Cheng et al. | 359/168 |
| 4,956,877 | 9/1990 | Kroll et al. | 359/168 |
| 5,231,611 | 7/1993 | Laznicka et al. | 359/141 |
| 5,333,088 | 7/1994 | Sweet | 359/144 |
| 5,361,157 | 11/1994 | Ishikawa et al. | 359/168 |

FOREIGN PATENT DOCUMENTS

| | | | |
|---|---|---|---|
| 2513049 | 3/1983 | France | 359/168 |
| 0003704 | 1/1978 | Japan | 359/168 |
| 0062943 | 3/1989 | Japan | 359/168 |

OTHER PUBLICATIONS

*Optoelectronics and Lightwave Technology*, John Wiley and Sons, Inc. (1992), pp. 11–12, 104–105, 169–171, 226–241.

Saleh et al., *Fundamentals of Photonics*, John Wiley and Sons, Inc. (1991), pp. 286–287, 702–704, 890–891.

Primary Examiner—Leslie Pascal
Attorney, Agent, or Firm—G. S. Grunebach; M. W. Sales; W. K. Denson-Low

[57] ABSTRACT

A telemetry system for receiving data from large arrays of sensors, in which the sensors are located in an unprotected environment, is implemented using fiber optic components. Laser sources, located in a protected environment, transmit light through the boundary separating the protected environment from the unprotected one. The light is then split into a number of beams and fed to electro-optical modulators, where it is modulated in response to electrical signals received from the sensors. The modulated light signals are then wavelength-division multiplexed and transmitted back through the environment boundary, where they are amplified, demultiplexed and converted to electrical signals. Multiplexing reduces the number of boundary penetrations, and the use of highly stable electro-optical modulators eliminates the need for signal conditioning electronics at each sensor. This optical approach is particularly beneficial in an underwater application, such as a submarine receiving data from a large array of acoustic sensors, where it is desired that hull penetrations be minimized and the underwater components be highly reliable and stable.

26 Claims, 4 Drawing Sheets

FIBER-OPTIC TELEMETRY SYSTEM AND METHOD FOR LARGE ARRAYS OF SENSORS

BACKGROUND OF THE INVENTION

1. Field of the Invention

This invention relates to telemetry systems and methods for receiving data from remote sensors, particularly those systems that receive data from a large array of sensors located in an unprotected environment or an area in which electrical power is unavailable.

2. Description of the Related Art

Numerous sensors produce electrical signals that vary in accordance with some external stimulus, such as sound, light, pressure, or any other physical phenomenon. Often, such a sensor has a low level output that requires some kind of conditioning, such as filtering or amplification, prior to being sent to a receiver. This is often accomplished with electronic signal conditioning circuits, necessarily located close to the sensor in order to minimize the losses and distortion that can occur when a low level output has to travel a significant distance by wire to reach a receiver.

Problems can arise in such an all-electronic system when the sensor is located in an unprotected environment, such as underwater or in space, and the sensor signal is to be received in a stable, protected environment, such as inside a submarine or a spacecraft. If conditioning electronics are required, these circuits, due to their close proximity to the sensor, are subjected to the same environment as the sensor. Furthermore, in many applications electrical power is unavailable or undesirable in the unprotected environment, making use of an all-electronic telemetry system difficult or impossible. If the system includes a large array of sensors located in an unprotected environment, the possible problems can be much greater. A large number of cables must now penetrate the boundary between the unprotected environment and the protected one, causing difficulty if the protected environment must be isolated from the unprotected one, as on a submarine. Multiplexing circuits can be added to minimize the number of boundary penetrations, but they would also need to be located in the unprotected environment of the sensors.

These "outboard" electronic components, located in the unprotected environment near the sensors, such as amplifiers, multiplexers, and filters, are complex electronic devices that require periodic maintenance and repair. This maintenance can be difficult or impossible due to the inaccessibility of the components and the harshness of the environment, thus raising serious system reliability concerns. Furthermore, particularly for a large array of sensors, severe weight and cost penalties can be incurred when conditioning electronics are needed for each sensor, and these conditioners must be designed to tolerate the harshness of the environment. Inter-channel crosstalk and susceptibility to electromagnetic interference are other problems inherent in all-electronic telemetry systems. Finally, as mentioned above, the unavailability of electrical power may make an electronic system infeasible.

SUMMARY OF THE INVENTION

The present invention seeks to provide a reliable, high performance, lightweight, cost-effective system and associated method for receiving data from sensors located in unprotected environments or in areas where unpowered, passive operation is required.

These goals are accomplished by utilizing fiber optic technology to connect one or more sensors, located "outboard," i.e. in an unprotected environment, with a corresponding number of receivers, located "inboard," i.e. in a protected environment. An inboard optical light source, typically a laser, provides light to an outboard electro-optical modulator, where the intensity of the incoming light is modulated in accordance with an electrical signal received from a sensor. The modulated light is then transmitted back inboard, to be received by a photodetector receiver and converted back into an electrical signal. To accommodate a large array of sensors, the outputs of a relatively small number of inboard lasers are split into a number of beams for supplying light to a larger number of modulators, with each modulator connected to a sensor. The modulator outputs are then wavelength-division multiplexed for transmission inboard, where the outputs are amplified, demultiplexed, and fed to individual photodetector receivers for conversion back to electrical signals. Optical fiber is used to interconnect all the optical components, i.e. light sources, modulators, amplifiers, demultiplexers, and receivers.

One advantage of the invention's all-optical approach is that all outboard components may be "passive," i.e. components for which no external power is required for operation. This characteristic is highly desirable in applications where the harshness of the sensor environment renders the supplying of electrical power difficult, or when a passive system is essential for covertness.

One application of this optical approach to telemetry is a system for receiving data aboard a submarine from an array of acoustic sensors located underwater. The sensor array is preferably mounted to the hull of a submarine, or alternately, can be towed behind a vessel. Such a system is preferably constructed with the most environmentally sensitive, high cost optical components, i.e. the laser light sources, photodetector receivers, and optical amplifiers, positioned inboard the submarine. Lower cost, environmentally stable, passive components, i.e. the splitters, modulators, and multiplexers, are located outboard the submarine, in watertight enclosures. Laser light sources are connected to splitters via optical fibers passing through the submarine's hull. The splitters divide each laser's light into a number of beams, and each beam is connected to the optical input of an "electro-optical acoustic sensor" (E-O AS). A preferred E-O AS is fabricated from a polyvinyl di-fluoride (PVDF) panel (though a conventional ceramic hydrophone may be preferable for some applications) that produces an electrical signal which varies in accordance with an acoustic stimulus, connected to an electro-optical modulator based on a Mach-Zehnder interferometer. The electrical signal from the PVDF panel impresses a voltage on the interferometer, causing the intensity of light received at the input of the modulator to be modulated. The modulated light signals are then wavelength-division multiplexed for transmission back through the hull and into the submarine. Once inboard, the multiplexed signals are optically amplified, demultiplexed, and fed to photodetector receivers. The receivers convert the received optical signals back into electrical signals corresponding to the signals generated by each PVDF panel. By properly configuring the E-O AS, a highly stable, low distortion modulated optical signal is produced, eliminating the need for signal conditioning on the outboard side of the system. A system of this configuration, via the use of splitters and wavelength-division multiplexers, also minimizes the number of fibers that penetrate the hull. Hull penetrations pose a threat to the structural integrity of the vessel, and keeping such penetrations to a minimum is a significant advantage of the invention. Further, all high cost, environmentally sensitive optical components are inboard, simultaneously providing protection and maintenance access. This type of all-optical system provides excellent inter-channel crosstalk immunity, superior dynamic range, and an immunity to electro-magnetic interference.

This all-optical approach is applicable with many types of sensors that produce an electrical signal in accordance with an external stimulus, and a variety of acoustic sensor types would be usable for the underwater application discussed above. The large array configuration discussed above would be equally beneficial for underwater, space-based or airborne applications, as well as ground-based systems, due to the superior EMI, crosstalk, and dynamic range characteristics inherent in an optical system, particularly when all-passive sensing is a desired system characteristic. Even a one sensor system is benefitted by the use of fiber optic components when the sensor is located in an unprotected environment: system reliability is enhanced by eliminating the need to place conditioning electronics near the sensor, in addition to the ability to operate without electrical power in the sensor area.

Further features and advantages of the invention will be apparent to those skilled in the art from the following detailed description, taken together with the accompanying drawings.

DETAILED DESCRIPTION OF THE INVENTION

Figure 1:
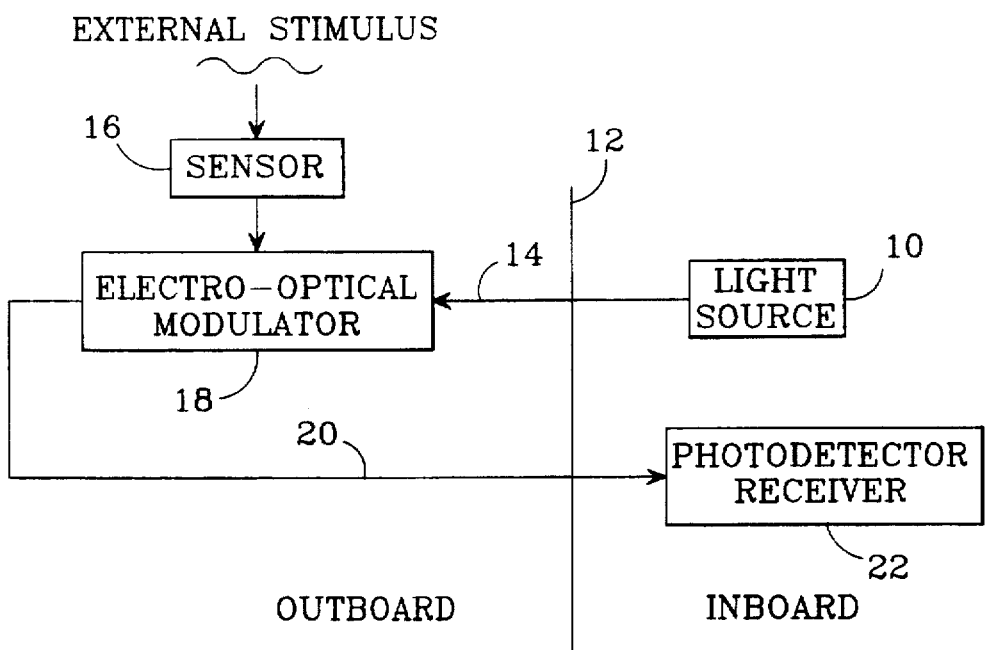
FIG. 1 is a block diagram illustrating the basic principles of the optical modulation approach used in invention.

A block diagram of a basic fiber optic telemetry system, where the sensors are remotely located in an "unprotected" environment, i.e. an area with harsh or varying ambient conditions and referred to herein as "outboard," is shown in FIG. 1. An optical light source 10, typically a laser, is located within a "protected" environment, i.e. a dry, environmentally stable area that is referred to herein as "inboard." Light is carried through the boundary 12 separating the inboard environment from the outboard environment via optical fiber 14. A sensor 16 which produces an electrical signal that varies in accordance with an external stimulus is connected to an electro-optical modulator 18. The modulator 18 receives the laser light and modulates the intensity of the light in accordance with the electrical signal received from the sensor 16. The modulated light is then carried by optical fiber 20 back through the boundary 12 to the inboard side, where it is received with a photodetector receiver 22. The receiver 22 converts the modulated light signal back into an electrical signal that corresponds with the electrical signal produced by the sensor 16, and thus to the external stimulus detected by that sensor.

Figure 2:
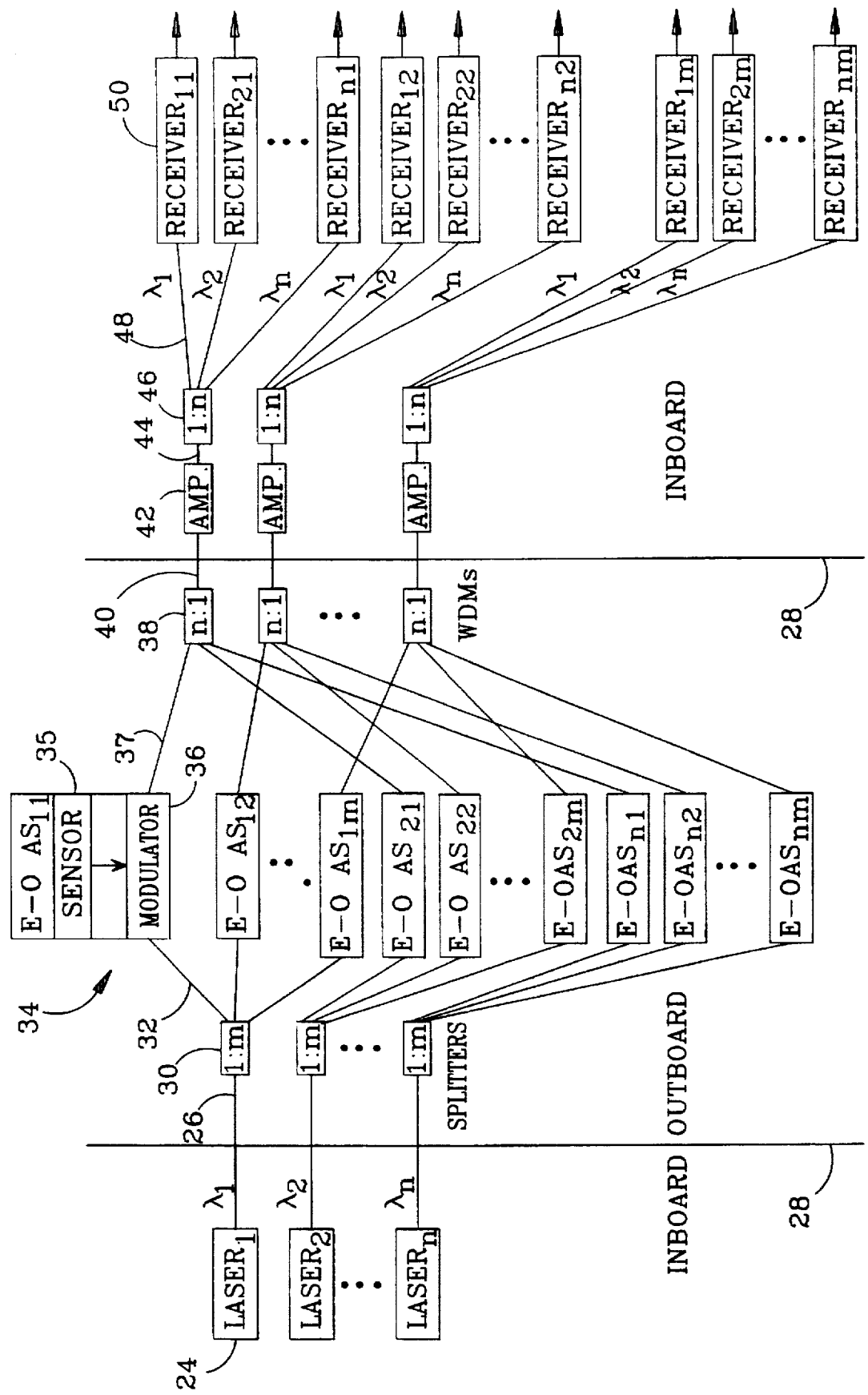
FIG. 2 is a block diagram of the preferred embodiment of the telemetry approach used in the invention.

The novel telemetry system architecture shown in FIG. 2 is designed to accommodate a large number of sensors, while simultaneously keeping the number of optical fibers penetrating the inboard/outboard boundary low, and protecting the most environmentally sensitive and costly optical components by placing them inboard. A typical application of the system is with a large underwater acoustic sensor array, rigidly mounted to the hull of a submarine. Alternately, this approach is applicable to an underwater sensor array sending data to a vessel positioned some distance away. Another application would be in space with, for example, magnetic, radiation, or thermal sensors located in the unprotected environment of space feeding data to the inside of a spacecraft. The system could be utilized in many other environments, but is particularly beneficial when it is desired to minimize the number of inboard/outboard boundary penetrations, or to eliminate the need to place active electronic circuitry near the sensors in an unprotected, remote environment.

As shown in FIG. 2, a preferred embodiment of the invention is configured as follows: a number (n) of lasers 24 are located inboard, supplying continuous wave (CW), unmodulated light at unique wavelengths $\lambda_1-\lambda_n$. The output of each laser 24 is carried on its own optical fiber 26 through the boundary 28 separating the inboard and outboard environments, and is connected to an optical splitter 30. Each splitter 30 splits its respective laser output m times, resulting in m signals at the unique wavelength of the splitter's respective laser 24. Having n lasers 24, with each laser's output split m times, a total of m×n unmodulated optical signals are available to be modulated by corresponding sensor signals.

Each of the m×n signals from the splitters 30 is connected via a respective optical fiber 32 to a respective electro-optical acoustic sensor (E-O AS) 34, comprising an acoustic sensor 35 connected to an electro-optical modulator 36. Each E-O AS 34 produces an intensity modulated optical output that varies in accordance with an acoustic stimulus. Each of the m×n signals produced by the splitters 30 is connected to a respective E-O AS device, thus producing m×n modulated output signals.

The m×n modulated output signals are carried by optical fibers 37 to m wavelength-division multiplexers (WDMs) 38. Each WDM 38 is connected to receive as inputs a total of n modulated E-O AS 34 output signals, one signal originating from each laser 24, so that each of the n inputs has a unique wavelength. The n signals received by each WDM 38 are wavelength-division multiplexed into a single output, such that each WDM 38 output contains n signals, each of a unique wavelength. Each WDM 38 output is transmitted via a respective optical fiber 40 back through the boundary 28 to the inboard side, where it is preferably received by a respective one of m optical amplifiers 42. Each optical amplifier 42 boosts the optical power of the received output, and the resulting boosted output is sent via a respective optical fiber 44 to one of m demultiplexers 46. Each boosted signal is demultiplexed back into its n constituent signals, each of the n signals having a unique wavelength corresponding to the wavelength of its source laser 24. The n signals produced by each of m demultiplexers 46 results in a total of m×n signals. Each of these m×n signals is directed via a respective optical fiber 48 to a respective one of m×n photodetector receivers 50. Each photodetector receiver 50 converts its optical input to an electrical output signal. Each one of these m×n electrical output signals corresponds to the acoustic stimulus detected by its respective E-O AS 34.

The lasers 24 must be chosen so that their output wavelengths are within the useful spectral range of the optical amplifiers 42. Further, to enable the use of wavelength-division multiplexing, each laser must produce light at a unique wavelength. The term "unique wavelength" is intended to include the narrow band output of typical lasers. Preferably, each optical light source 24 comprises a low cost, low power Fabry-Perot diode laser operating at about 1550 nm, having an external cavity with an optical grating. This results in an stable laser source that has a narrow linewidth, with the capability to be tuned to a desired wavelength within each laser's gain spectrum. This type of laser is described in J. E. Midwinter and Y. L. Guo, *Optoelectronics and Lightwave Technology*, John Wiley and Sons, Inc. (1992), pp. 226–241. It is important that the laser sources have these characteristics, which make the use of wavelength-division multiplexers practical. Lasers having wavelengths other than 1550 nm are usable as long as the optical amplifiers 42 and photodetector receivers 50 in the system will also work at the chosen wavelengths.

Figure 3:
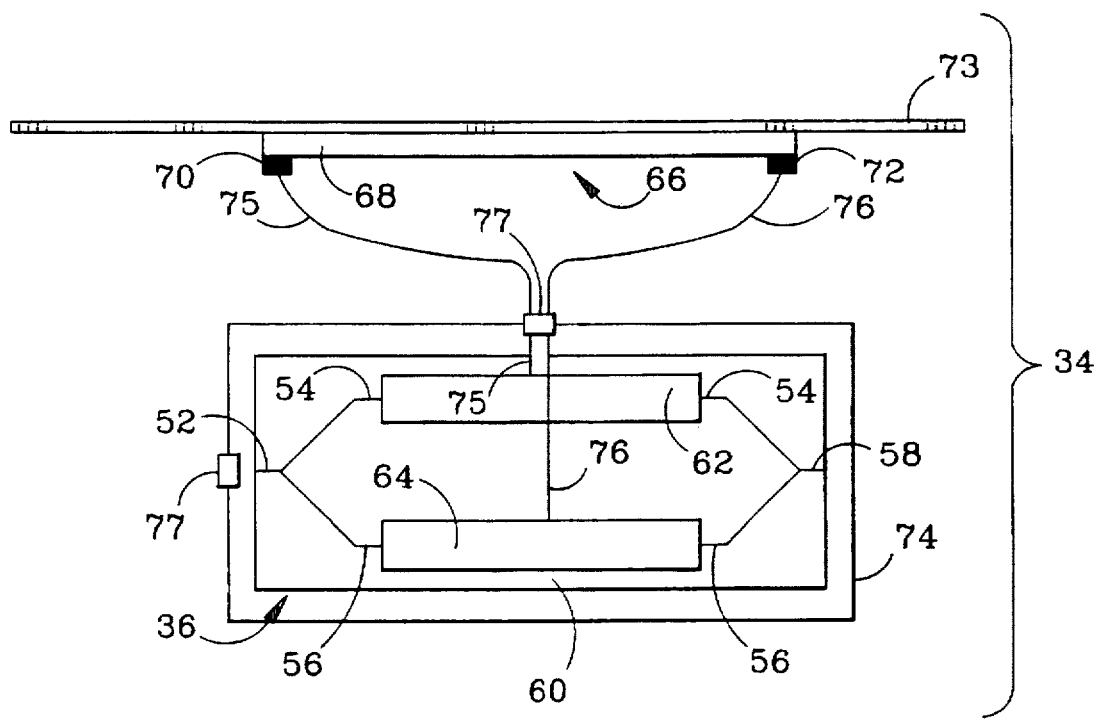
FIG. 3 is a conceptual schematic representation of an electro-optical acoustic sensor (E-O AS) built in accordance with the invention.

A preferred E-O AS 34 is shown in FIG. 3. The heart of the E-O AS 34 design is an electro-optical modulator 18 made in the well-known Mach-Zehnder interferometer configuration. An electro-optical modulator of this type is described in B. E. A. Saleh and M. C. Teich, *Fundamentals of Photonics*, John Wiley and Sons, Inc. (1991), pp. 702–704. The Mach-Zehnder interferometer is configured as an optical transmission path, with light entering an optical waveguide 52 at the input of the interferometer, being divided into two parallel waveguides 54, 56 and then recombining into a single waveguide 58 at the output of the interferometer. Preferably, the interferometer is formed on a lithium niobate substrate 60, and the optical waveguides 52, 54, 56, 58 are titanium-diffused into the substrate. Two electrodes 62, 64 are then positioned on top of the interferometer, one electrode over each parallel waveguide 54, 56, to create an electro-optical modulator 18. An acoustic sensor 66 may utilize either a polyvinyl di-fluoride (PVDF) panel, a ceramic hydrophone, or a similar device that produces an electrical signal in accordance with an acoustic stimulus. Cost, weight, and the nature of the application should be considered when selected an acoustic sensor. For the hull-mounted acoustic array application discussed herein, a lightweight, passive sensor is required. For this application, the acoustic sensor is preferably made from a thin sheet of PVDF 68, with two electrodes 70, 72 attached to the PVDF sheet across which the electrical signal from the sensor is generated. The acoustic sensor 66 is preferably affixed to a rigid backing 73, to provide mechanical integrity and to which other sensors can be affixed. The sensor 66 will be exposed to the water, and is remotely located from the modulator 18, which would preferably be mounted in a watertight enclosure 74. The electrical signal produced by the sensor 66 is connected to the modulator electrodes 62, 64 via wires 75, 76. Wires 75, 76, and optical fibers for connecting to the input and output optical waveguides 52, 58, pass through the watertight enclosure's 74 walls via pressurized feedthroughs or connectors 77.

The electrical input signal from acoustic sensor 66 is typically AC in nature, and as such the voltage potential between the two electrodes 62, 64 can assume both positive and negative values. Thus, depending on the sign of the relative voltage, the optical phase is retarded in one of the parallel waveguides 54, 56 and advanced in the other due to the electro-optic modulation effect of the lithium niobate crystal forming the modulator substrate 60. When the parallel waveguides 54, 56 recombine, the optical phase difference results in an intensity modulation. Due to the coherent nature of this recombination, the modulator's transfer function, i.e. the optical power output versus the modulating signal input, has a sinusoidal shape.

Figure 4:
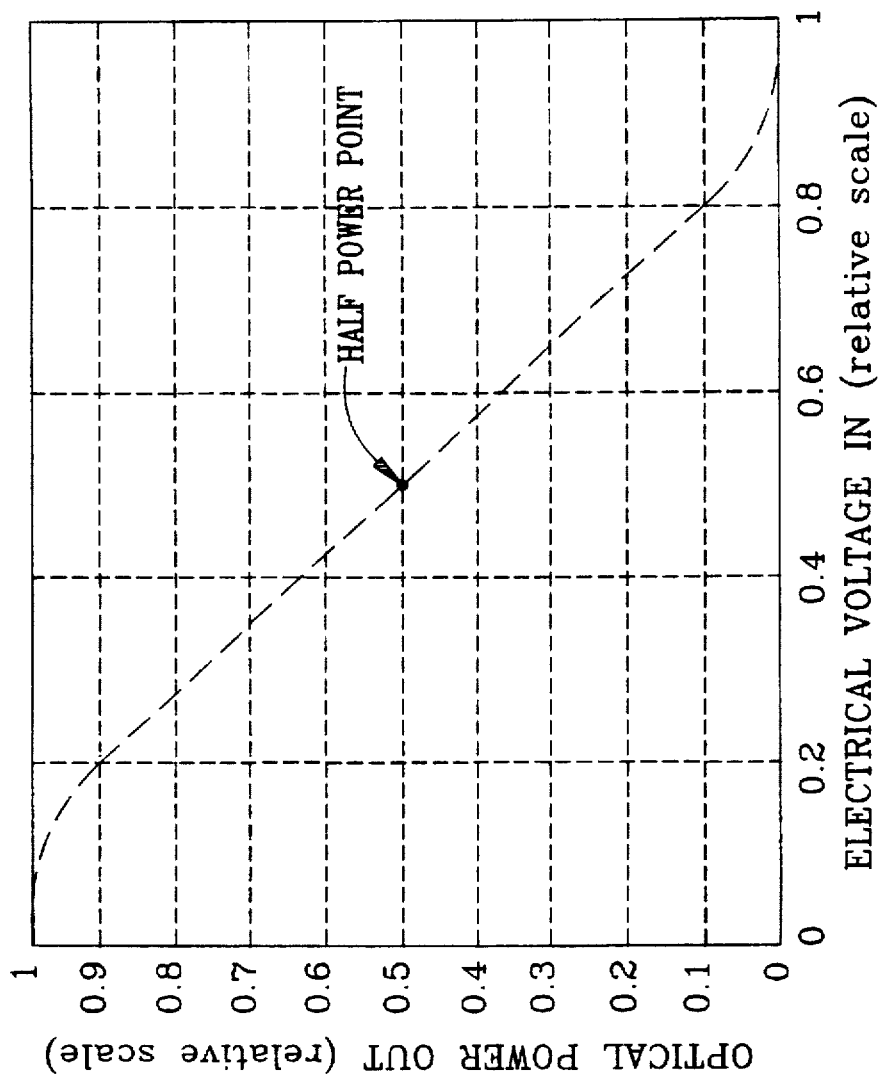
FIG. 4 is a graph depicting the transfer function of the electro-optical modulator shown in FIG. 3.

A plot of a typical transfer function for the above-described electro-optical modulator 18 is shown in FIG. 4. As can be seen from the plot, the modulation is highly linear as long as the modulator 18 is operated over a limited portion of its range. Preferably, the modulator 18 is biased so that its quiescent operating point, i.e. the condition when no signal is applied to the modulator electrodes 62, 64, is at the "half power" point. That is, with no voltage applied to the electrodes 62, 64, the modulator will attenuate the incoming light by 50%. A varying voltage such as that received from the acoustic sensor 66 will cause the light intensity to be modulated around this 50% point. In this way, the modulator 18 is kept within the linear region of its transfer function. Electro-optical modulators 18 of this type, designed to maintain a half power bias point, are highly stable over a large range of environmental conditions. This is particularly important in an underwater application, whereby this stability allows the modulator 18 to remain in the linear portion of its transfer function, and to be largely insensitive to changes in hydrostatic pressure. This feature eliminates the need for a complex modulator-demodulator function to recover the acoustic signal, which may otherwise be necessary in a system that is more sensitive to changes in hydrostatic pressure.

Another advantage of biasing the Mach-Zehnder electro-optical modulator 18 at its half power point is that the resultant modulator has an odd transfer function; all even-order distortion products are eliminated. This is important in multi-octave systems in which even-order distortion products can be much stronger than odd-order distortion products, thereby severely limiting dynamic range. The elimination of even-order distortion products by maintaining the modulator's bias point at the half power point, is a significant advantage of this optical approach. A final advantage is that half power point biasing enables further linearization of the modulator transfer function using electronic techniques at the output of the receivers 50. This technique is discussed below.

The electro-optical modulator 18 is coupled to an acoustic sensor 66. The underwater acoustic array system described above requires a sensor that provides an electrical signal that varies in accordance with an acoustic stimulus. Preferably, an acoustic sensor 66 is made from a thin sheet of the polymer material polyvinyl di-fluoride (PVDF) 68. This material is well-suited to a large acoustic array application due to its light weight, low cost, manufacturing producibility, reliability, and high acoustic sensitivity. An acoustic sensor 66 made from either a PVDF sheet 68 or a ceramic hydrophone is a good match for the electro-optical modulator 18 described above. Both have a piezoelectric characteristic, and thus produce an output voltage that varies in accordance with changes in pressure. The modulator 18 is a device that responds to changes in voltage. A PVDF-based or ceramic hydrophone acoustic sensor 66, combined with an electro-optical modulator 18 as described above, form an acoustically sensitive, highly stable, linear, electro-optical acoustic sensor (E-O AS) 34.

Wavelength-division multiplexers (WDMs) 38 are utilized to multiplex the E-O AS 34 outputs before they are transmitted inboard. Wavelength-division multiplexing allows a plurality of optical input signals to be combined into one output signal, providing that each of the input signals is of a unique wavelength. WDMs 38 are typically fabricated using fused fiber coupler technology, and incorporate reflective fiber gratings. WDMs of this type are described in B. E. A. Saleh and M. C. Teich, *Fundamentals of Photonics*, John Wiley and Sons, Inc. (1991), pp. 890–891.

The state of the WDM art imposes a limit on the number of input signals that can be combined, currently less than one hundred. The input signal limit imposed by the chosen WDM will in turn impose an equal limit on the number of laser sources that can be employed. There are n WDMs 38 in the preferred embodiment, one for each laser 24 wavelength. Thus, if the chosen WDM has an upper limit of, for example, forty input signals, there will also be an upper limit of forty on the number of laser sources 24 that can be employed.

The use of optical amplifiers 42 is not essential. Using amplifiers 42 is preferred, however, as they will compensate for optical losses that occur before the amplifier, improve the dynamic range of the system, and enable the use of the lower-power, less expensive Fabry-Perot diode laser sources discussed above. An optical amplifier 42 that has a spectral range encompassing the wavelengths of the laser sources 24 it will be amplifying should be used. It is preferred that erbium-doped fiber amplifiers (EDFAs) be utilized, since the gain spectrum of such amplifiers is compatible with the use of multiple laser sources of the type discussed above, i.e. those having wavelengths around 1550 nm. Currently, the gain spectrum of an EDFA can accommodate about 50 wavelengths spaced about 1 nm apart. Amplifiers 42 of this type are discussed in J. E. Midwinter and Y. L. Guo, *Optoelectronics and Lightwave Technology*, John Wiley and Sons, Inc. (1992), pp. 11–12 and 169–171.

The demultiplexers 46 preferred in the large array telemetry system each receive an input signal that is composed of a plurality of wavelengths, and separate this input signal back into the constituent signals that were combined by the WDM 38. The demultiplexer 46 is fabricated similar to the WDM 38, but by designing the fiber grating geometries correctly, the device can be made to either combine multiple wavelengths onto a single fiber (WDM), or separate a combined signal into individual constituent signals (demultiplexer). Demultiplexers of this type are discussed in J. E. Midwinter and Y. L. Guo, *Optoelectronics and Lightwave Technology*, John Wiley and Sons, Inc. (1992), pp. 104–105.

All embodiments discussed require a photodetector receiver 50 for converting the modulated optical signal into an electrical signal. A receiver 50 that is functional at the wavelength of the incoming light should be used. A receiver 50 using a low speed InGaAsP PIN photodiode is preferred. Receivers of this type are commercially available.

The optical fibers 26, 32, 36, 40, 44, 48 used for all optical interconnections are preferably single-mode. A single mode fiber is essential when used with the preferred narrow linewidth laser sources 24, the Mach Zehnder-based modulators 18, the wavelength-division multiplexers 38, and the erbium-doped amplifiers 42 described above. Furthermore, the fibers 26 connecting the laser sources 24 to the splitters 30, and the fibers 32 between the splitters 30 and the E-O AS devices 34 are not only single-mode but preferably polarization-maintaining as well. These types of fibers are discussed in E. E. A. Saleh and M. C. Teich, *Fundamentals of Photonics*, John Wiley and Sons, Inc. (1991), pp. 286–287.

The splitters 30 are preferably built to maintain the polarization of the incoming light. Splitters of this type can be custom-built by firms such as Optics for Research.

Figure 5:
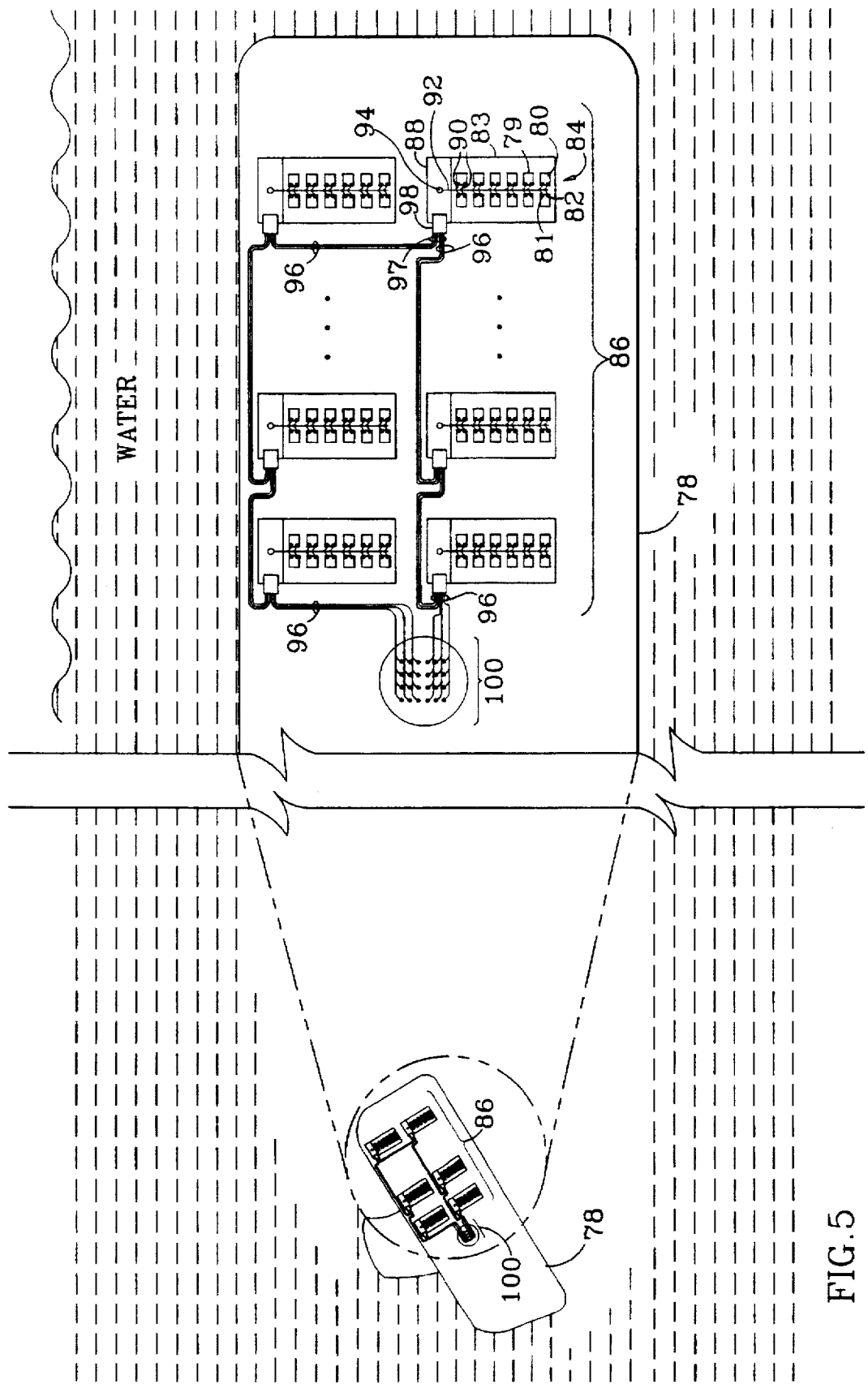
FIG. 5 is a elevation view of the preferred embodiment of the invention.

An application of the invention in a preferred embodiment, as an acoustic array system rigidly mounted to the hull of a submarine 78, is shown in FIG. 5. The size of the sensors, the sensor spacing, the number of sensors, and the geometric configuration of the sensors should be selected to meet the requirements of a particular system. Acoustic sensors 79 are typically formed from fifteen centimeter square PVDF sheets 80, each sheet having two electrodes 81, 82 attached to it across which the electrical signal from the sensor is generated. The acoustic sensors 79 are mounted to a rigid mounting plate 83 to establish their desired spacing, for example twenty centimeters apart in both vertical and horizontal directions, and to provide mechanical integrity. A mounting plate 83 having twelve sensors 79, arranged into two columns and six rows, would constitute a typical subarray 84. An array 86 might consist of thirty subarrays 84 arranged in two adjacent rows of fifteen subarrays each, with each subarray rigidly mounted to the submarine's 78 hull. This would result in an array 86 that is twelve sensors 79 in the vertical direction by thirty sensors in the horizontal direction, "vertical" and "horizontal" being relative to the orientation of the submarine. For this configuration, n×m=12×30, for an array size of 360 acoustic sensors.

Attached to an end of each mounting plate 83 is a watertight enclosure 88 for housing the optical components, i.e. the splitters, modulators, and WDMs. Electrical wires 90 from each acoustic sensor 79 are routed to the optical components in the enclosure 88 via a cable bundle 92; this bundle would interface to the enclosure through a sealed connector or feedthrough 94. Inside the enclosure 88, the electrical wires are routed to the electro-optic modulators, which would be securely mounted to surfaces or structures within the enclosure. Optical fiber cables 96 into and out of the enclosure 88 would preferably be routed through the wall of the enclosure as a cable bundle 97, using a pressurized feedthrough or multi-channel optical connector 98. Optical fiber cables 96 interconnecting the subarrays 84, and connecting to the submarine 78 must be designed to withstand the undersea environment. Note that FIG. 5 is only illustrative—the number and routing of interconnecting optical fiber cables 96, and the distribution of optical components among the watertight enclosures 83 is dependent on the requirements of a particular system.

Optical signals pass between the interior and exterior of the submarine 78 via openings made in the pressurized hull, known as hull penetrators 100. These penetrators 100 are the equivalent of pressurized bulkhead connectors, and are capable of maintaining the structural integrity of the hull.

Another application of this telemetry system would be an acoustic array that is towed behind a vessel to which it is sending data. Sensors may be dispersed in a desired pattern, with the system components interconnected with reinforced optical cable capable of physically towing the components, withstanding the ocean environment, and transmitting the optical signals.

There are several criteria to consider when determining appropriate values for m and n. These include: how many optical fibers may penetrate the inboard/outboard boundary; the desired dynamic range (i.e. the ratio of maximum distortion-free signal to the minimum detectable signal) of the system; the cost constraints imposed on the system. Physical limitations include the input signal maximum for the chosen wavelength-division multiplexers 38, and the width of the gain spectrum of the erbium-doped fiber amplifiers 42 that are used. Increasing m by dividing each laser's output among more modulators 18 will reduce the number of boundary penetrations and laser sources needed for a given number of sensors, but doing so introduces losses and reduces the dynamic range of the system. Conversely, dividing a laser's output among fewer modulators will increase the system's dynamic range, but will require more lasers 24 and boundary penetrations for the same number of sensors.

An array size of 400 sensors, where m=n=20, is viable, using the types of components discussed herein. Twenty lasers 24 are used, with their respective wavelengths spaced approximately 1 nm apart. This range of wavelengths fits within the gain spectrum of the preferred EDFA 42, and results in each WDM 38 receiving twenty inputs. Assuming typical performance from commercially available components, a dynamic range of greater than 103 db-Hz$^{2/3}$ is attainable for such a telemetry system.

Dynamic range can be further enhanced by applying an inverse sine function at the output of each photodetector receiver 50, to compensate for the sinusoidal transfer function of the modulator 18. However, this linearization technique is only effective if the modulator 18 is biased at its half power point, as discussed above.

While particular embodiments of the invention have been shown and described, numerous variations and alternate embodiments will occur to those skilled in the art. Accordingly, it is intended that the invention be limited only in terms of the appended claims.

We claim:

1. An electro-optic data transmission and reception system, comprising:
   at least one light source, located in a protected environment,
   an optical splitter, located outside of said protected environment, said splitter receiving light from a respective light source and splitting said light into a plurality of output signals,
   a plurality of electro-optical modulators, located outside of said protected environment, each modulator arranged to receive a respective output signal from said splitter and modulating said output signal in accordance with an external stimulus,
   a multiplexer, located outside of said protected environment, said multiplexer receiving modulated output signals from a plurality of said modulators and combining them into a multiplexed output signal,
   a demultiplexer, located in a protected environment, demultiplexing said multiplexed output signal into a plurality of demultiplexed signals, and
   a receiver, located in a protected environment, coupled to receive one of said demultiplexed signals from said demultiplexer and convert it to an electrical signal,
   the number of said modulators being greater than the number of said light sources and the number of optical signals passing from the unprotected to the protected environments being less than the number of said modulated output signals received by said multiplexer.

2. The apparatus of claim 1, wherein said at least one light source is a laser.

3. The apparatus of claim 1, wherein each of said electro-optical modulators includes a Mach-Zehnder interferometer.

4. The apparatus of claim 1, further comprising a plurality of acoustic sensors that each converts a respective acoustic stimulus to an electrical signal, said sensors connected to respective ones of said modulators for modulating said output signals from said splitter in accordance with said respective acoustic stimuli.

5. The apparatus of claim 1, wherein said electro-optical modulators are passive devices, requiring no external source of electrical power to operate.

6. An electro-optic data transmission and reception system, comprising:
   a plurality of lasers, each producing light with a unique wavelength,
   a plurality of optical splitters, each receiving light from a respective laser and splitting said light into a plurality of output signals having the same unique wavelength as said received light,
   a plurality of sensors, each producing an electrical signal that varies in accordance with an external stimulus,
   a plurality of electro-optic modulators, each connected to receive the electrical signal produced by a respective one of said sensors, each of said modulators receiving light from a respective splitter, and producing a modulated light signal that varies in accordance with said electrical signal,
   a plurality of wavelength-division multiplexers (WDMs), each receiving the modulated light signals produced by a plurality of said modulators wherein each of said signals has a unique wavelength, each of said WDMs combining said modulated light signals into a wavelength-division multiplexed output signal,
   a plurality of demultiplexers, demultiplexing the wavelength-division multiplexed output signals of respective WDMs into a plurality of signals, each of which corresponds to the modulation of a respective electro-optic modulator,
   a plurality of photodetector receivers, each receiving the output signal produced by a respective one of said demultiplexers, each of said receivers producing an electrical output that varies in accordance with said demultiplexer signal, and
   a plurality of optical fibers, said optical fibers providing optical transmission paths between said lasers and said splitters, between said splitters and said modulators, between said modulators and said WDMS, between said WDMs and said demultiplexers, and between said demultiplexers and said photodetector receivers.

7. The apparatus of claim 6, wherein said modulators each comprise a lithium niobate substrate, a Mach-Zehnder interferometer on said substrate, and an electrode structure that applies a signal from a respective sensor to modulate said interferometer.

8. The apparatus of claim 6, wherein said optical fibers between said lasers and said splitters, and between said splitters and said modulators are single mode and polarization-maintaining, and said optical fibers between said modulators and said WDMs, between said WDMs and said demultiplexers, and between said demultiplexers and said photodetector receivers are single-mode.

9. The apparatus of claim 6, wherein said sensors are acoustic sensors that produce an electrical signal that varies in accordance with an acoustic stimulus.

10. The apparatus of claim 9, wherein said acoustic sensors are formed from polyvinyl di-fluoride (PVDF).

11. The apparatus of claim 9, wherein said acoustic sensors comprise ceramic hydrophones.

12. The apparatus of claim 6, comprising n lasers, n optical splitters, each splitting received light into m output signals, n×m sensors, n×m electro-optical modulators, m WDMs, each receiving the modulated light signals from n of said modulators, m demultiplexers, demultiplexing the outputs of respective WDMs into n×m signals, and n×m photodetector receivers.

13. The apparatus of claim 6, wherein said lasers, said demultiplexers and said photodetector receivers are positioned within a protected environment, and said splitters, said modulators, said sensors and said WDMs are positioned in an unprotected environment, with only one interconnecting optical fiber per WDM passing through a boundary that separates the protected environment from the unprotected environment.

14. The apparatus of claim 13, wherein said protected environment is the inside of a submarine, and said unprotected environment is water.

15. The apparatus of claim 6, wherein said splitters, said modulators, said sensors and said WDMs are passive devices, such that no external source of electrical power is required for their operation.

16. The apparatus of claim 6, further comprising a plurality of optical amplifiers, each amplifier interposed between a respective one of said WDMs and a respective one of said demultiplexers, receiving the wavelength-division multiplexed output signal from its respective WDM, boosting the optical power of said wavelength-multiplexed output signal, and providing said boosted signal to its respective demultiplexer, said amplifiers connected between said WDMs and said demultiplexers with respective single mode optical fibers, said amplifiers positioned within a protected environment.

17. The apparatus of claim 16, wherein said amplifiers are erbium-doped fiber amplifiers.

18. The apparatus of claim 17, wherein said lasers generate light at wavelengths that are within the spectral range of said erbium-doped amplifiers.

19. The apparatus of claim 6, wherein said lasers are Fabry-Perot diode lasers operating at a wavelength of about 1550 nm, said lasers each having an external cavity with an optical grating such that each laser provides a narrow linewidth and wavelength-selective tuning capability, said lasers supplying continuous-wave (CW) light.

20. The apparatus of claim 6, wherein each electro-optical modulator has a sinusoidal transfer function, and is biased at its half power point, said half power point biasing enabling each electro-optical modulator to operate in a linear region of its sinusoidal transfer function with a high degree of stability, thereby increasing each modulator's insensitivity to changes in ambient pressure, said biasing further causing said electro-optical modulators to have an odd transfer function that inhibits even-order distortion products and enhances their dynamic range.

21. The apparatus of claim 20, wherein an inverse sine function is applied at the output of each photodetector receiver to compensate for the sinusoidal transfer function of each electro-optic modulator, thus improving the linearization and increasing the dynamic range of each modulator.

22. A method of receiving data in a protected environment, produced by a plurality of modulators located in an unprotected environment, comprising the steps of:

generating at least one light signal from within a protected environment, transmitting said light signal from said protected environment to an unprotected environment, splitting said light signal into a plurality of output signals in said unprotected environment, modulating said output signals in said unprotected environment in accordance with respective external stimuli, multiplexing a plurality of said modulated output signals into a multiplexed output signal, transmitting said multiplexed output signal from said unprotected environment to said protected environment, demultiplexing said multiplexed output signal into a plurality of demultiplexed signals, and receiving said demultiplexed signals within said protected environment and converting said demultiplexed signals to respective electrical signals that vary in accordance with said demultiplexed signals, the number of said output signals produced by said splitting being greater than the number of said light signals and the number of optical signals passing from the unprotected to the protected environments being less than the number of said modulated output signals.

23. The method of claim 22, wherein said at least one light signal is generated by a laser.

24. The method of claim 22, wherein said at least one light signal is transmitted to said unprotected environment and said multiplexed output signal is transmitted from said unprotected environment through optical fiber.

25. The method of claim 22, wherein said light is modulated by a plurality of electro-optical modulators that each includes a Mach-Zehnder interferometer.

26. The method of claim 22, further comprising the step of amplifying the modulated output signals prior to receiving and converting them to electrical signals.

* * * * *